United States Patent [19]
Beene

[11] Patent Number: 6,108,183
[45] Date of Patent: Aug. 22, 2000

[54] CURRENT LIMITER

[75] Inventor: Gerald W. Beene, Southlake, Tex.

[73] Assignee: Marconi Communications, Inc., Cleveland, Ohio

[21] Appl. No.: 09/237,984

[22] Filed: Jan. 25, 1999

Related U.S. Application Data

[60] Provisional application No. 60/102,715, Oct. 1, 1998.

[51] Int. Cl.[7] ...................................................... H02H 3/00
[52] U.S. Cl. ......................... 361/93.8; 361/93.9; 361/94; 361/103; 361/79; 361/118
[58] Field of Search ........................... 361/58, 93.1, 93.4, 361/93.8, 93.9, 94, 103, 104, 79, 86–87, 111, 91.1, 117–118

[56] References Cited

U.S. PATENT DOCUMENTS

| | | |
|---|---|---|
| 3,729,671 | 4/1973 | Jeffery et al. . |
| 4,173,174 | 11/1979 | Bloch et al. . |
| 4,180,768 | 12/1979 | Ferraro ........................................ 323/9 |
| 4,222,097 | 9/1980 | Rogowsky . |
| 4,311,986 | 1/1982 | Yee . |
| 4,458,288 | 7/1984 | Chapman, Jr. et al. . |
| 4,620,271 | 10/1986 | Musil . |
| 4,733,325 | 3/1988 | Loeech . |
| 4,736,269 | 4/1988 | Amela et al. . |
| 4,787,007 | 11/1988 | Matsumura et al. ....................... 361/98 |
| 4,935,642 | 6/1990 | Obelode et al. . |
| 4,979,066 | 12/1990 | Kawata et al. ............................. 361/10 |
| 5,117,219 | 5/1992 | Tice et al. . |
| 5,144,544 | 9/1992 | Jenneve et al. . |
| 5,301,050 | 4/1994 | Czerwiec et al. . |
| 5,329,142 | 7/1994 | Kitagawa et al. . |
| 5,347,417 | 9/1994 | Motoori . |
| 5,568,347 | 10/1996 | Shirai et al. ............................... 361/98 |
| 5,706,157 | 1/1998 | Galecki et al. . |
| 5,898,557 | 4/1999 | Baba et al. ................................ 361/103 |

OTHER PUBLICATIONS

Davis, Jeff, "To Bulk Or Not to Bulk," Telephony Magazine, Jun. 29, 1992.

*Primary Examiner*—Michael J. Sherry
*Attorney, Agent, or Firm*—Jones, Day, Reavis & Pogue

[57] ABSTRACT

A current limiter is provided that includes a power switch for receiving input power from a power source and passing at least a portion of the input power to an output, a current sense mechanism coupled to the power switch for sensing current flowing through the current limiter and for providing a current flow signal related to the current flow through the current limiter, and a control mechanism coupled to the power switch that causes the power switch to reduce the current flow when the current flow signal indicates that the current flow exceeds a first current flow level. In one embodiment the current limiter may include a voltage sense mechanism that senses the voltage drop across the input to output of the device and use a reference voltage and a control loop to maintain the voltage drop relatively constant at all load currents. In another embodiment the current limiter may include a timing mechanism that provides a timing signal that is used by the control mechanism to cause the power switch to block power transmission to the load. In yet another embodiment the current limiter may include a temperature sensing mechanism that provides a first temperature signal that is used by the control mechanism to cause the power switch to block power transmission when the temperature signal indicates that a monitored temperature exceeds a reference temperature. Optionally, the current limiter may include a surge voltage protection mechanism that blocks high voltage power surges from the output. Also, the current limiter may include short circuit protection means.

39 Claims, 3 Drawing Sheets

CURRENT LIMITER

This application claims the benefit, under 35 U.S.C. §119(e), of U.S. Provisional Application Ser. No. 60/102,715 filed Oct. 1, 1998.

BACKGROUND OF THE INVENTION

The present invention is related to the field of power distribution between a centrally located power source and a plurality of remote loads. In particular, the invention describes a current limiter circuit for managing the power supplied from a central power supply to a remotely located load such as a telephony load or other remote electronic device. The current limiter monitors current, voltage, internal temperature, and the elapsed time while managing power distribution to meet system requirements for the remote powering of remote electronic devices.

A particularly useful application for the invention of this disclosure is in the powering of a specific type of remote electronic device, an optical network unit ("ONU"). An ONU is a device that is used as an interface between fiber optic telecommunication lines and traditional wires used to provide telecommunication services such as cable television and telephonic services to homes or other buildings.

Typically, several ONUs are positioned in the field to provide telecommunication services to different geographic locations and are provided power from a single local power hub ("LPH"). The ONUs are provided power through a pair of wires from power supplies within the LPH. The LPH could be located up to 6000 feet away from a particular ONU. A separate pair of powering wires is routed to each ONU from the LPH. Commonly, each powering wire pair is powered from an individual power supply within the LPH so that the voltage and current supplied can be closely regulated. Such a system, however, increases the physical size of the LPH and also increases the cost because several individual power supplies are required to power the several ONUs.

One attempt at solving this problem has been to utilize a central power supply and to couple each powering wire pair to the power supply through a dedicated current limiter for that powering wire pair. Such a system is described in U.S. Pat. No. 5,706,157 and is incorporated herein by reference. In the system of U.S. Pat. No. 5,706,157, a single power source feeds a plurality of powering wire pairs that are current limited by an active current limiter for each wire pair.

Current limiters of the type described in U.S. Pat. No. 5,706,157, however, suffer from several disadvantages. They do not provide adequate protection from voltage surges. Because the powering wire pairs to the remote electronic device may be up to 6000 feet long, they are susceptible to hazards such as high-voltage lightning strikes and power cross resulting from power lines falling across the powering wire pair.

Present current limiters are also disadvantaged because they do not regulate voltage drop but rather have a variable voltage drop. Industry standards in the telecommunication field limit the maximum deliverable voltage to power lines to 140 V as a safety precaution to make the power lines safer for workers in the field who may work on the power lines. To ensure that present current limiters deliver no more than 140 V to the load, the voltage supplied by power sources to present current limiters is limited to 140 V plus the minimum voltage drop from the current limiter. Because the voltage drop in the current limiter could be greater than the minimum, the voltage delivered by present current limiters to the power lines could be less than 140 V. For example, if the voltage drop in present current limiters varied from 1.5 to 3 V, the maximum voltage delivered by the power source to the current limiter would be no higher than 141.5 V and the voltage delivered from the current limiter to the power lines would vary between 140 V to 138.5 V. With a regulated voltage drop, power sources could be adjusted to deliver a higher voltage to the current limiter and the current limiter could ensure that the maximum allowable voltage is always delivered to the load. It is important that the highest possible voltage is delivered to the load so that the power delivered the load is maximized: the power available to the load is directly proportional to the square of the delivered voltage. Current limiters of the type described in U.S. Pat. No. 5,706,157 have an unregulated voltage drop.

Additionally, present current limiters are disadvantaged because they do not allow for a periodic release of voltage to line. In applications such as the ONU application, a protector module may be placed between the limiter and the powering pair. The protector module limits surges originating from lightning or other undesirable sources. The protector module also exists at the load. The protector at the load may activate or fire due to a surge and remain on thus shunting power away from the telephony equipment. It would be desirable to have a mechanism for disconnecting the power to allow the fired protectors to reset thus eliminating the need to manually reset the protector.

Further, present current limiters are disadvantaged because they lack thermal protection circuits. The temperature inside of equipment cabinets that house the current limiters could become elevated due to a number of conditions, including excess self-generated heat by the current limiters and equipment failures such as blown fans fuses and heat exchanger failures. If the equipment cabinets' temperature rises too high, the present current limiters' electronics could fail because they lack thermal protection circuits.

Therefore, there remains a need in this art for an improved current limiter. There remains a more particular need for an improved current limiter that provides protection against power surges such as those caused by lightning strikes or power cross. There also remains a more particular need for an improved current limiter that regulates voltage drop. There remains a further need for an improved current limiter that periodically releases voltage. Finally, there remains a need for an improved current limiter that includes thermal protection circuitry.

SUMMARY OF THE INVENTION

The present invention overcomes the problems noted above and satisfies the needs in this field for an improved current limiter that provides an interface between a high voltage power supply and a remote load device. The current limiter of the present invention senses current, voltage, temperature, and elapsed time to provide the characteristics necessary for remotely powering remote electronic devices over long wire pairs.

The present invention provides many advantages over the presently known current limiters. Not all of these advantages are simultaneously required to practice the invention as claimed, and the following list is merely illustrative of the types of benefits that may be provided, alone or in combination, by the present invention. These advantages include: (1) preventing excess current from exiting to the load; (2) protecting the power supply from surge voltage and surge current originating at the load; (3) providing means for regulating load voltage by providing a regulated voltage drop from power supply to load; (4) providing a programmed power interrupt to allow loads that may latch up to recover; and (5) providing internal temperature sensing power interrupt to protect against over heating.

In accordance with the present invention, a current limiter is provided that includes a power switch for receiving input power from a power source and passing at least a portion of the input power to an output, a current sense mechanism coupled to the power switch for sensing current flowing through the current limiter and for providing a current flow signal related to the current flow through the current limiter, and a control mechanism coupled to the power switch that causes the power switch to reduce the current flow when the current flow signal indicates that the current flow exceeds a first current flow level. In one embodiment the current limiter may include a voltage sense mechanism that senses the voltage drop across the input to output of the device and use a reference voltage and a control loop to maintain the voltage drop relatively constant at all load currents. In embodiment the current limiter may include a timing mechanism that provides a timing signal that is used by the control mechanism to cause the power switch to block power transmission to the load. In yet another embodiment the current limiter may include a temperature sensing mechanism that provides a first temperature signal that is used by the control mechanism to cause the power switch to block power transmission when the temperature signal indicates that a monitored temperature exceeds a reference temperature. Optionally, the current limiter may include a surge voltage protection mechanism that blocks high voltage power surges from the output. Also, the current limiter may include short circuit protection means.

These are just a few of the many advantages of the present invention, as described in more detail below. As will be appreciated, the invention is capable of other and different embodiments, and its several details are capable of modifications in various respects, all without departing from the spirit of the invention. Accordingly, the drawings and description of the preferred embodiments set forth below are to be regarded as illustrative in nature and not restrictive.

BRIEF DESCRIPTION OF THE DRAWINGS

The present invention satisfies the needs noted above as will become apparent from the following description when read in conjunction with the accompanying drawings wherein.

DETAILED DESCRIPTION OF THE DRAWINGS

Figure 1:
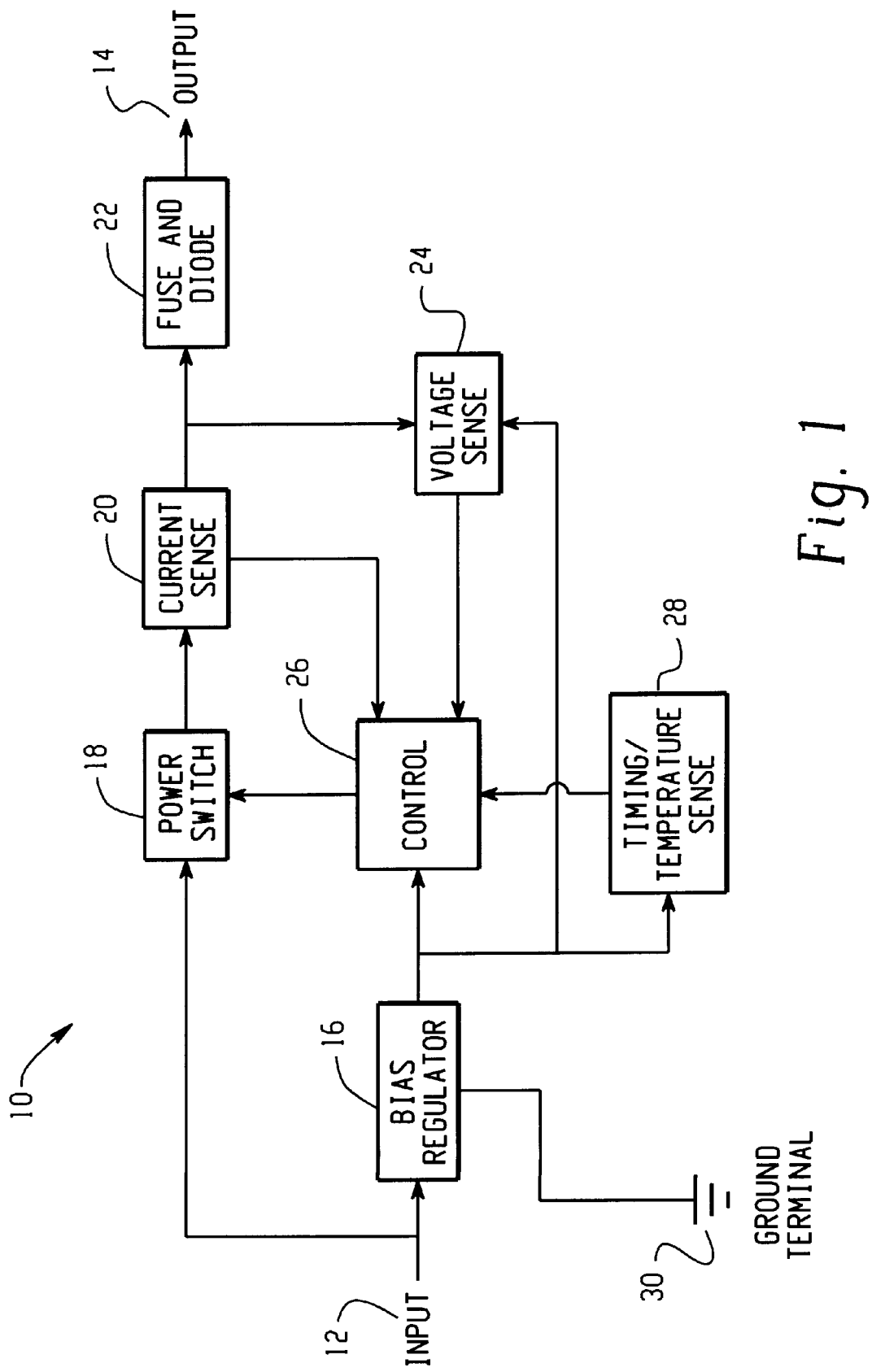
FIG. 1 is a block diagram of a preferred embodiment of a current limiter according to the present invention.

Referring now to the drawings, FIG. 1 sets forth a block diagram of a preferred embodiment of a current limiter 10 according to the present invention. This preferred embodiment provides coupling between an input power supply line 12, and output line 14 to the load, and ground, and may include a bias regulator 16; power switch 18; current sense circuitry 20; fuse and diode circuit 22; voltage sense circuitry 24, control circuit 26 and timing/temperature sense circuitry 28. The operation and detailed description of these elements and the overall circuit is set forth below in connection with FIG. 2.

Figure 2A:
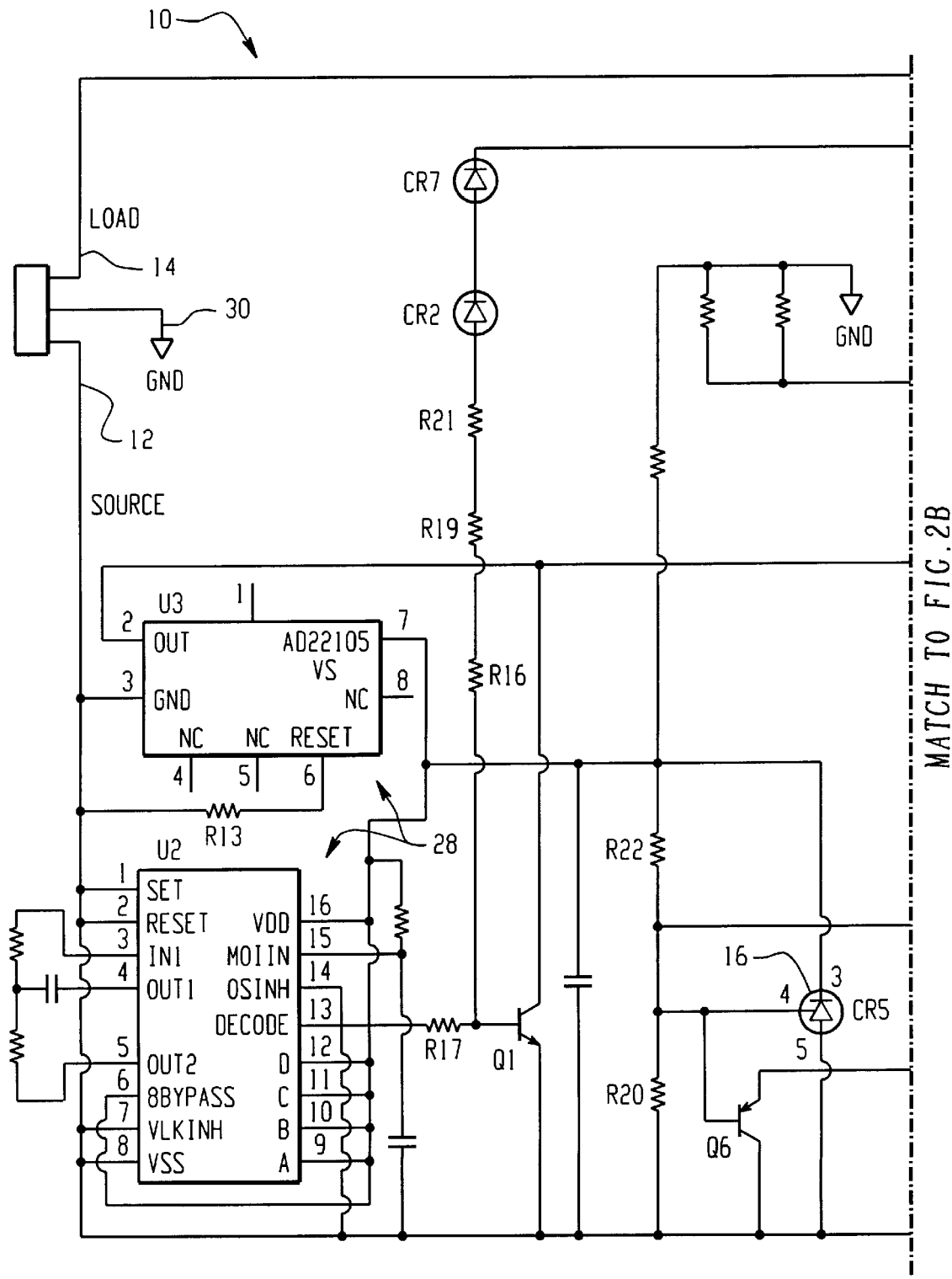
FIG.2 is a detailed circuit schematic of the preferred embodiment shown in FIG. 1.
Figure 2B:
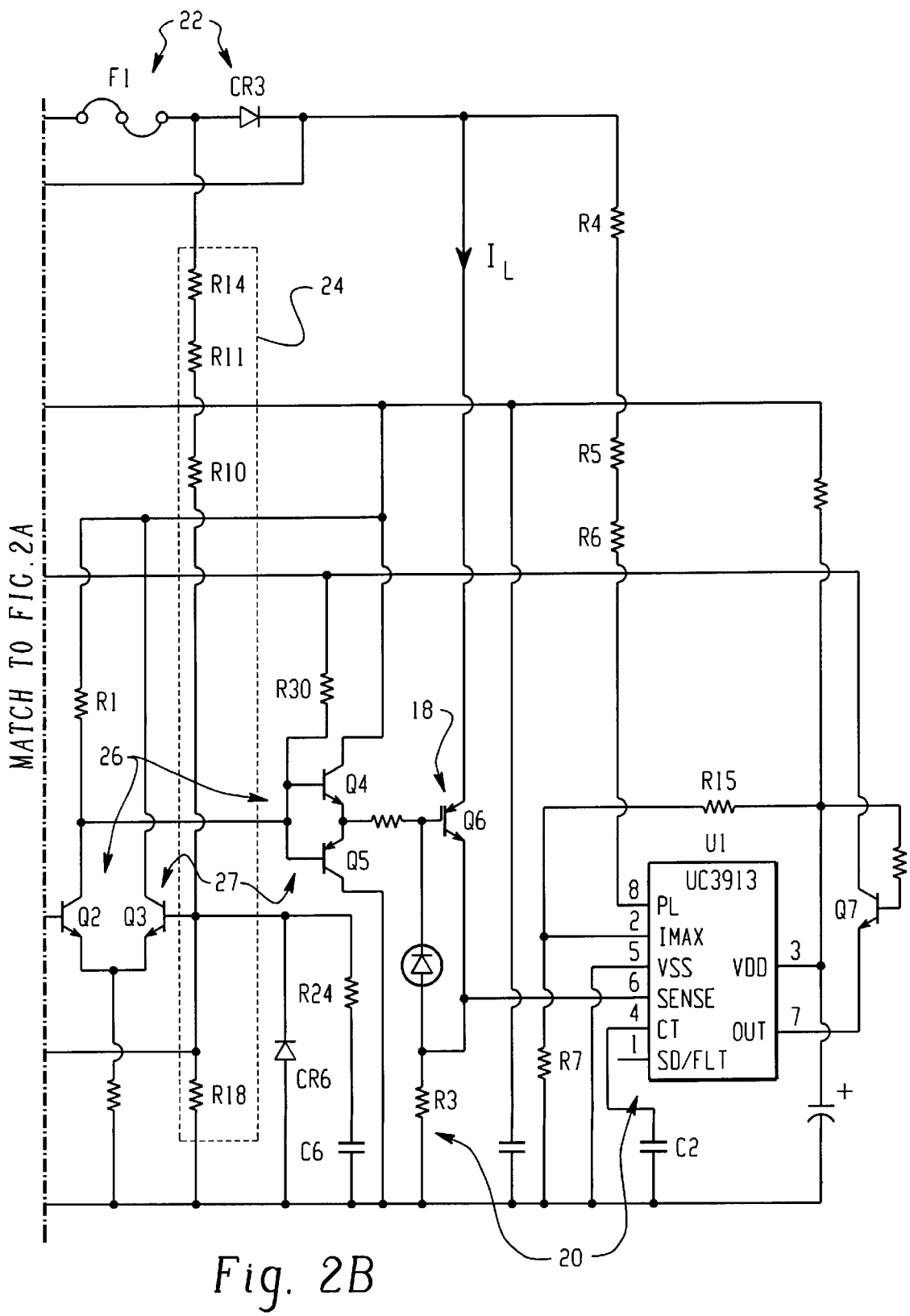

FIG. 2 is a detailed circuit schematic of the preferred embodiment of the current limiter 10 shown in FIG. 1. The following description describes a preferred embodiment of the present invention that is adapted for use in a Fiber-to-the-Curb ("FTTC") digital loop carrier system. This preferred current limiter 10 is a three terminal device (12, 14, 30) designed to provide an interface between a power supply (not shown), a −140V bulk supply 12 in this embodiment, and a loop output 14 that powers a remote telephony terminal, such as an Optical Network Unit ("ONU"). A FTTC system includes a plurality of host digital terminals ("HDTs") that are connected to the central switching office via fiber optic lines. Each HDT then connects to a plurality of ONUs via fiber optic lines for transporting voice information and/or other services, and a power pair for delivering power from the IDT (which has access to AC power) to the ONUs (which do not have access to AC line power.) This preferred current limiter 10 is provided as a plug-in unit.

The current limiter 10 performs a current limit function by limiting the current when it exceeds internally programmed fault levels. The limiting is accomplished by a combination of peak current limiting and pulsed on-time control. There are two fault levels set by the current limiter 10.

The first fault level is reached when the current flowing to the load exceeds a current threshold level set by internal references. When the first fault level condition is reached, the current limiter 10 accomplishes its current limit function by pulsing the power switch 18 on and off. The ratio of on-time to off-time ("duty cycle") of this pulsed operation results in the average current flowing to the load to be well below the desired current limit. This pulsed operation is also desirable because it keeps the current limiter's power dissipation at a reasonable level. The duty cycle of the pulsed operation preferably starts at about 3% and may change with load conditions.

The second fault level is reached when the current flowing to the load is extremely heavy such as when there is a short circuit. When the second fault level condition is reached, the current limiter 10 preferably limits current flow by pulsing the power switch 18 on and off and by limiting the peak current flowing to the load during the on-time by adjusting the conduction level of the power switch 18. Also, the duty cycle may preferably be decreased to about 0.1% under certain loads. This adjustment is preferably done in such a way that the power dissipation on the current limiter 10 is controlled. As one example of the benefits of pulsed operation, if the on-current is 2 Amps and the duty cycle is 1%, the average current will be 0.02 Amps.

In normal operation, when current is not limited, the current limiter 10 also provides a controlled voltage drop so that a regulated voltage is provided to the loop output 14. The regulated voltage is a combination of power supply voltage less the current limiter drop. The current limiter 10 also produces a momentary power interruption every 60 seconds to allow a latched protector module at the load to reset. The current limiter 10 is designed to survive the surges and power fault voltages that may make it through a primary protector. The current limiter 10 is also protected from excess temperature with a temperature sensing switch.

The power switch 18 provides the current regulation and is the control element for the voltage drop regulation. In the illustrated embodiment, the power switch 18 is IGBT Q6, part no. MGW12N120, although any number of devices such as a MOSFET or bipolar transistor may be used.

The current sense circuitry 20 senses the current flowing from the power supply line 12 to the output line 14. In the embodiment shown, current sense 20 comprises resistor R3, which is positioned in series between the power supply line 12 and the power switch 18, and integrated circuit U1 Resistor R3 develops a voltage across it as current flows between the power supply line 12 and the output line 14. The voltage across resistor R3 is proportional the current flowing to the output line 14. The preferred resistor R3 has a value of 0.08 Ohms to set the current fault level at 0.05/0.08=625 mAmps. Integrated circuit U1 senses the voltage across resistor R3 and, if the voltage exceeds a threshold, sends a signal to the control 26 causing current limiting to begin. The preferred U1 is Unitrode part number UCC2913.

Fuse and diode circuit 22 provide both a primary and back-up protection function for current limiter 10. Fuse F1 protects current limiter 10 from excess current flow which could occur due to a failed limiter and is a back-up current limiter. Diode CR3 isolates the current limiter 10 from any negative surge due to lightning strike or power cross.

Bias regulator 16 comprises low current voltage reference integrated circuit CR5. The cathode of bias regulator 16 regulates itself in order to maintain 1.24 volts (referenced to the input line) on the control lead using an internal reference and feedback. The control lead voltage is used as a reference for the transistor amplifier Q2–Q3 that regulates the voltage drop between the input and output of the current limiter. The bias regulator 16 also maintains the voltage on its cathode at 5 volts (referenced to the input line) for powering the Timing\Temp sense circuitry 28. Resistors R22 and R29 set the 5 Volts by dividing down 5 Volts to 1.24 volts.

Voltage sense circuitry 24 comprises resistors R10, 11, 14, & R18. Voltage sense 24 measures the voltage across the current limiter 10 and provides a signal proportional to the voltage sensed, to the input of amplifier Q2–Q3.

Timing\Temp sense circuitry 28 comprises temperature sensor U3 and oscillator timer U2. Temperature sensor U3 senses when the internal temperature rises above a first threshold level and sends a signal level to control 26 indicating that the temperature threshold has been exceeded. Temperature sensor U3 resets the signal level when the temperature drops below a second threshold. In the preferred embodiment the shut-off temperature is 125 C. and the turn-on temperature is 121 C. The preferred temperature sensor U3 is from Analog Device, part number AD22105.

Oscillator timer U2 sends a periodic pulse to control 26 to signal the control 26 to pulse-off current limiter 10. In the preferred embodiment the period pulse occurs every 60 seconds and lasts for 1 ms. The preferred oscillator timer U2 is a CMOS timer, Motorolla part number MC14536.

Control circuit 26 controls the operation of power switch 18. When the output current is too high or a surge current is detected, control 26 sets power switch 18 to a lower current conduction state. Control 26 also controls the regulated output voltage provided by power switch 18. Control 26 monitors the signal from timing\temp sense 28 and shuts off power switch 18 when the internal temperature exceeds a first threshold, turns power switch 18 back on when the internal temperature falls below a second threshold, and periodically shuts off power switch 18 based on receipt of the periodic pulse from timing\temp sense 28. Control 26 also regulates the voltage drop across the current limiter 10 by power switch 18 based on the input from voltage sense 24. In the embodiment shown, control 26 comprises transistors Q2, 3, 4, and 5, which together form a discrete amplifier 27.

During normal operations, the load current IL is less than the trip point, preferably 0.5 or less Amps in this application, and the regulated voltage drop across the current limiter 10 is controlled to about 3 Volts. The voltage regulator amplifier 27 accomplishes this control by comparing a reference voltage generated on the base of transistor Q2 with a fraction of the voltage drop, appearing on the base of transistor Q3, and providing gate drive to power switch Q6 based on the difference between the two voltages. Power switch Q6 holds the voltage drop at a nominal 3 Volts from input 12 to output 14 of the current limiter 10. The reference voltage provided to the base of Q2, is generated by active Zener reference diode CR5 which provides 1.24 volts (referenced to the input line) to the base of transistor Q2 and a regulated 5V (referenced to the input line) supply for timer U2 and temperature sensor U3. Capacitor C6 and resistor R24 provide compensation to keep the voltage regulator loop of the current limiter stable. Timer U2 contains a 1KHz RC oscillator which counts down to fire a 1ms pulse once every minute. The 1 ms pulse is used to briefly turn off current limiter 10 to allow a latched protector module at the load to reset. The ONU contains filter capacitors which maintain power to the ONU for the 1 ms current interruption.

When a high current condition is detected, the preferred current limiter 10 functions as follows. The load current IL passes through resistor R3 and develops a voltage for current sensing. Integrated circuit U1 senses the voltages across resistor R3 and when the sensed voltage reaches 5 mV, integrated circuit U1 causes capacitor C2 to charge toward 2.5 Volts. When the voltage across capacitor C2 reaches 2.5 Volts, the output of integrated circuit U1 will cause power switch Q6 to turn off. To turn off Q6, U1 sends a turn power off command by dropping the voltage on pin 7. Pin drives the emitter of grounded base amplifier Q7 and the collector of Q7 forwards the control to buffer amplifier Q4/Q5. Amplifier 26 consists a differential amplifier voltage gain stage Q2/Q3 followed by a unity gain buffer state Q4/Q5. This buffer stage drives the gate of IGBT Q6. The input of buffer Q2/Q3 may be controlled by: (1) a differential amplifier Q2/Q3; (2) the collector of Q7; (3) the output of the timer U2 through Q1 collector; or (4) by the temperature sense U3 circuit. Therefore in normal operation mode (not limiting) Q2/Q3 controls the gate of Q6 through Q4/Q5 to regulate the voltage drop to about 3 Volts across the current limiter 10. In this condition R30 carries essentially no current. The transistor collectors of Q7, Q1, and the internal transistor of the temperature switch are able to override the voltage regulation function of Q2/Q3 and control Q6. Q7 is also used to isolate the output of U1 from the voltage appearing on the collector of Q7. This voltage exceeds the available voltage out of U1.

Resistors R4, R5, and R6 provide load voltage information to integrated circuit U1 so that power dissipation in power switch 18 can be controlled. The power dissipation of the power switch 18 during current limiting is controlled by setting the percentage of time that the switch is on. The voltage across the power switch 18 is sensed by resistors R4, R5, and R6 and as the voltage increases, the duty cycle is decreased. In a very heavy load condition, the pulsed current could exceed what could safely be handled by power switch 18. In this condition, the current during the time when the switch is on is limited to a current called IMAX. IMAX is set by the voltage off resistor divider R15/R7 and for this preferred implementation IMAX is set to about 5 Amp. This 5 Amp is not the average current but is the peak current during the pulsing of the switch.

When an excessively high current condition is detected the preferred current limiter 10 functions as follows. If the load current IL is suddenly increased such that the peak current IL far exceeds 5 Amps, integrated circuit U1 regulates peak current during pulsing to about 5 Amp. This threshold is set by the R15–R7 divider. In this state, the pulse modulation will begin and limit the power dissipated in the current limiter 10.

The current limiter 10 is designed to survive surges which may pass through a primary protector. Three sets of series resistors, resistors R16, R19, & R21; resistors R10, R11, & R14; and resistors R4, R5, & R6, are arranged in this preferred embodiment to safely handle the anticipated surge voltage by each sharing a portion of the voltage and preferably are surface mount resistors to conserve space. The series resistors could be replaced by a single high voltage resistor to perform the same flnction.

During a negative surge, diode CR3 holds off the voltage to all of the circuitry except resistors R10, R11 & R14. The resistor string R10, R11, and R14 connected to the base of transistor Q3 is prevented from over driving transistor Q3 by clamp diode CR6. This diode CR6 limits the voltage swing on the base of transistor Q3 to one negative diode drop below the input line.

During a positive surge, the same resistor string R10, R11 and R14 is prevented from overdriving transistor Q3 by the clamping action of the emitter of transistor Q8. It is important to limit the overdrive to transistor Q3 to allow for quick recovery after a surge. As the surge voltage reaches about 180 volts more positive than the input line, the zener diode pair CR2 and CR7 conduct and turn on transistor Q1. Transistor Q1 pulls the gate drive away from power switch Q6 preventing a high voltage/high current situation for power switch Q6. As power switch Q6 turns off, its collector voltage quickly rises. Power switch Q6 is capable of surviving a voltage surge of 1000V.

Current limiter 10 includes protection against high internal temperatures. Temperature sensor U3 is a temperature sensing circuit with hysteresis. The sense point is set by the value of resistor R13. In some applications, the current limiter 10 may require external fans for cooling. The temperature sense will prevent damage to the current limiter 10 in the event of excess temperature by cycling the unit on and off until the temperature returns to normal.

Current limiter 10 also preferably includes Fuse F1 which functions as a default current limit in the event a current limiter 10 fails to operate.

Having described in detail the preferred embodiment of the present invention, including its preferred modes of operation, it is to be understood that this operation could be carried out with different elements and steps. This preferred embodiment is presented only by way of example and is not meant to limit the scope of the present invention which is defined by the following claims.

What is claimed:

1. A current limiter comprising:
   a) a power switch for receiving input power from a power source and passing at least a portion of the input power to an output;
   b) a current sense mechanism coupled to said power switch for sensing current flowing through the current limiter and for providing a first current flow signal related to the current flow through the current limiter;
   c) a control mechanism coupled to said power switch, said control mechanism being operative to cause said power switch to reduce the current flow when said first current flow signal indicates that the current flow exceeds a first current flow level;
   d) a temperature sensing mechanism coupled to said control mechanism and being operative to provide a temperature signal related to a monitored temperature; and
   e) wherein said control mechanism is operative to cause said power switch to block power transmission when said temperature signal indicates that the monitored temperature exceeds a first temperature level, said control mechanism also being operative to cause said power switch to cease blocking power when said temperature signal indicates that the monitored temperature has fallen below a second temperature level.

2. The current limiter according to claim 1 further comprising:
   a voltage sense mechanism coupled to the output and said control mechanism, said
   voltage sense mechanism being operative to sense the voltage between the input and the output and to provide a voltage drop between the input and the output that is regulated.

3. The current limiter according to claim 1 further comprising:
   a timing mechanism coupled to said control mechanism and providing a timing signal, said control mechanism being responsive to said timing mechanism so as to cause said power switch to block power transmission to said output based on said timing signal.

4. The current limiter according to claim 3 wherein said timing signal is periodic.

5. The current limiter according to claim 1 wherein said second temperature level is less than said first temperature level.

6. The current limiter according to claim 1 further comprising:
   a surge voltage protection mechanism coupled to said output, said surge voltage protection mechanism being operative to block at least a portion of high voltage transmitted from the output to the current limiter.

7. The current limiter according to claim 6 wherein said surge voltage protection mechanism shuts down said current limiter when said high voltage is sensed.

8. A current limiter comprising:
   a) a power switch for receiving input power from a power source and passing at least a portion of said input power to an output;
   b) a current sense mechanism coupled to said power switch for sensing current flowing through said current limiter and for providing a current flow signal related to the current flow through said current limiter;
   c) a control mechanism coupled to said power switch;
   d) a voltage sense mechanism coupled to said output and said control mechanism, said voltage sense mechanism sensing the voltage at said output and providing a voltage drop between said input and said output and providing a voltage drop between said input and said output that is regulated;
   e) a temperature sensing mechanism coupled to said control mechanism and providing a first temperature signal related to a monitored temperature;
   f) a timing mechanism coupled to said control mechanism and providing timing signal;
   g) a surge voltage protection mechanism coupled to said output, said surge voltage protection mechanism blocking at least a portion of high voltage transmitted from said output to said current limiter; and
   h) short circuit protection means for sensing that said current flow exceeds a second current flow level and providing a second current flow signal to said control mechanism indicating that said second current flow level has been exceeded; and (i) wherein said control mechanism causes said power switch to reduce said current flow when said current flow signal indicates that said current flow exceeds a first current flow level, said control mechanism causes said power switch mechanism adjust the voltage level at said output based on said voltage output signal, said control mechanism causes said power switch to block power transmission when said temperature signal indicates that said monitored temperature exceeds a first temperature level, said control mechanism causes said power switch to block power transmission to said output based on said timing signal, and said control mechanism causes said power switch to reduce current flow below said second current flow level.

9. A current limiter comprising:
  a) a power switch for receiving input power from a power source and passing at least a portion of the input power to an output;
  b) a current sense mechanism that is coupled to said power switch and that is operative to sense current flowing through the current limiter, said current sense mechanism being operative to provide a first current flow signal and a second current flow signal wherein said first current flow signal is related to the current flow through the current limiter and said second current flow signal indicates when the current flow exceeds a second current flow level; and
  c) a control mechanism coupled to said power switch, said control mechanism being operative to cause said power switch to reduce the current flow when said first current flow signal indicates that said current flow exceeds a first current flow level, said control mechanism also being operative to cause said power switch to reduce current flow below said second current flow level in response to said second current flow signal.

10. The current limiter according to claim 9 further comprising:
  a voltage sense mechanism coupled to the output and said control mechanism, said voltage sense mechanism being operative to sense the voltage between the input and the output and to cause the current limiter to provide a voltage drop between the input and the output that is regulated.

11. The current limiter according to claim 9 further comprising:
  a timing mechanism coupled to said control mechanism and providing a timing signal, said control mechanism being responsive to said timing mechanism so as to cause said power switch to block power transmission to the output based on said timing signal.

12. The current limiter according to claim 11 wherein said timing signal is periodic.

13. The current limiter according to claim 9 further comprising:
  a surge voltage protection mechanism coupled to the output, said surge voltage protection mechanism being operative to block at least a portion of high voltage transmitted from the output to the current limiter.

14. The current limiter according to claim 13 wherein said surge voltage protection mechanism shuts down the current limiter when the high voltage is sensed.

15. A current limiter comprising:
  a) power switch means for receiving input power from a power source and passing at least a portion of the input power to an output;
  b) current sense means for sensing current flowing through the current limiter and for providing a first current flow signal related to the current flow through the current limiter;
  c) control means for causing said power switch means to reduce the current flow when said first current flow signal indicates that the current flow exceeds a first current flow level; and
  d) temperature sensing means for providing a temperature signal related to a monitored temperature, wherein said control means causes said power switch means to block power transmission when said temperature signal indicates that the monitored temperature exceeds a first temperature level, and wherein said control means causes said power switch means to cease blocking power when said temperature signal indicates that the monitored temperature has fallen below a second temperature level.

16. The current limiter according to claim 15 further comprising:
  voltage sense means for sensing the voltage at the output and causing the current limiter to provide a voltage drop between the input and the output that is regulated.

17. The current limiter according to claim 15 further comprising:
  timing means for providing a timing signal, said control means being responsive to said timing means so as to cause said power switch means to block power transmission to the output based on said timing signal.

18. The current limiter according to claim 17 wherein said timing signal is periodic.

19. The current limiter according to claim 15 wherein said second temperature level is the less than said first temperature level.

20. The current limiter according to claim 15 further comprising:
  surge voltage protection means for blocking at least a portion of high voltage transmitted from said output to said current limiter.

21. The current limiter according to claim 20 wherein said surge voltage protection means causes said current limiter to shut down when the high voltage is sensed.

22. A current limiter comprising:
  a) power switch means for receiving input power from a power source and passing at least a portion of the input power to an output;
  b) current sense means for sensing current flowing through the current limiter and for providing a first current flow signal related to the current flow through the current limiter; and
  c) control means for causing said power switch means to reduce the current flow when said first current flow signal indicates that said current flow exceeds a first current flow level, wherein said current sense means further senses that said current flow exceeds a second current flow level and provides a second current flow signal to said control means indicating that said second current flow level has been exceeded and wherein said control means causes said power switch to limit the peak amount of said current flow to a level below said second current flow level.

23. The current limiter according to claim 22 further comprising:
  voltage sense means for sensing the voltage at the output and causing the current limiter to provide a voltage drop between the input and the output that is regulated.

24. The current limiter according to claim 22 further comprising:

timing means for providing a timing signal, said control means being responsive to said timing means so as to cause said power switch means to block power transmission to the output based on said timing signal.

25. The current limiter according to claim 24 wherein said timing signal is periodic.

26. The current limiter according to claim 22 further comprising:

surge voltage protection means for blocking at least a portion of high voltage transmitted from the output to the current limiter.

27. The current limiter according to claim 26 wherein said surge voltage protection means shuts down said limiter when the high voltage is sensed.

28. A power distribution system for providing power from a central power supply to a remotely located electronic device comprising:

a) a power source;
b) a current limiter, the current limiter comprising:
 (i) power switch means for receiving input power from said power source and passing at least a portion of the input power to an output;
 (ii) current sense means for sensing current flowing through the current limiter and for providing a first current flow signal related to the current flow through the current limiter; and
 (iii) control means for causing said power switch means to reduce the current flow when said first current flow signal indicates that said current flow exceeds a first current flow level, wherein said current sense means further senses that said current flow exceeds a second current flow level and provides a second current flow signal to said control means indicating that said second current flow level has been exceeded and wherein said control means causes said power switch to reduce the current flow below said second current flow level; and
c) a remote electronic device for receiving power from the output.

29. The power distribution system according to claim 28 further comprising:

voltage sense means for sensing the voltage at said output and causing the current limiter to provide a regulated voltage drop between the input and the output.

30. The power distribution system according to claim 25 further comprising:

timing means for providing a timing signal wherein said control means causes said power switch means to block power transmission to said output based on said timing signal.

31. The power distribution system according to claim 28 further comprising:

a) temperature sensing means for providing a first temperature signal related to a monitored temperature; and
b) wherein said control means causes said power switch means to block power transmission when said temperature signal indicates that said monitored temperature exceeds a first temperature level.

32. The power distribution system according to claim 28 further comprising:

surge voltage protection means for blocking at least a portion of high voltage transmitted from said output to said current limiter.

33. The power distribution system according to claim 32 wherein said surge voltage protection means shuts down said limiter when said high voltage is sensed.

34. A power distribution system for providing power from a central power supply to a remotely located electronic device comprising:

a) a power source;
b) a current limiter, the current limiter comprising:
 (i) a power switch for receiving input power from a power source and passing at least a portion of the input power to an output;
 (ii) a current sense mechanism that is coupled to said power switch and that is operative to sense current flowing through the current limiter, said current sense mechanism being operative to provide a first current flow signal and a second current flow signal wherein said first current flow signal is related to the current flow through the current limiter and said second current flow signal indicates when the current flow exceeds a second current flow level; and
 (iii) a control mechanism coupled to said power switch, said control mechanism being operative to cause said power switch to reduce the current flow when said first current flow signal indicates that said current flow exceeds a first current flow level, said control mechanism also being operative to cause said power switch to reduce current flow below said second current flow level in response to said second current flow signal.

35. The power distribution system according to claim 34 further comprising:

a voltage sense circuit for sensing the voltage at the output and causing the current limiter to provide a regulated voltage drop between the input and the output.

36. The power distribution system according to claim 34 further comprising:

a timing circuit for providing a timing signal wherein said control mechanism causes said power switch to block power transmission to the output based on said timing signal.

37. The power distribution system according to claim 34 further comprising:

a) temperature sensing circuit for providing a first temperature signal related to a monitored temperature; and
b) wherein said control mechanism causes said power switch means to block power transmission when said temperature signal indicates that the monitored temperature exceeds a first temperature level.

38. The power distribution system according to claim 34 further comprising:

surge voltage protector for blocking at least a portion of high voltage transmitted from the output to the current limiter.

39. The power distribution system according to claim 38 wherein said surge voltage protection means shuts down said limiter when said high voltage is sensed.

* * * * *